(12) United States Patent
Kondo et al.

(10) Patent No.: US 7,803,447 B2
(45) Date of Patent: Sep. 28, 2010

(54) HIGH STRENGTH HONEYCOMB STRUCTURE, METHOD OF MOLDING THE SAME, AND HONEYCOMB STRUCTURE CONVERTER

(75) Inventors: Takahiro Kondo, Nagoya (JP); Yukihito Ichikawa, Nagoya (JP)

(73) Assignee: NGK Insulators Ltd., Nagoya (JP)

( * ) Notice: Subject to any disclaimer, the term of this patent is extended or adjusted under 35 U.S.C. 154(b) by 1063 days.

(21) Appl. No.: 10/487,153

(22) PCT Filed: Aug. 27, 2002

(86) PCT No.: PCT/JP02/08591

§ 371 (c)(1),
(2), (4) Date: Feb. 19, 2004

(87) PCT Pub. No.: WO03/021089

PCT Pub. Date: Mar. 13, 2003

(65) Prior Publication Data

US 2004/0206044 A1    Oct. 21, 2004

(30) Foreign Application Priority Data

Aug. 30, 2001 (JP) .............................. 2001-261897
Aug. 19, 2002 (JP) .............................. 2002-238253

(51) Int. Cl.
  B32B 3/12     (2006.01)
  B01D 46/00   (2006.01)
  B28B 3/26     (2006.01)
(52) U.S. Cl. ...................... 428/116; 428/188; 428/118; 55/529; 264/630

(58) Field of Classification Search ................. 428/116, 428/176, 117, 118, 119, 188, 73, 307.5, 34.5, 428/177, 304.4, 192; 264/177.12; 501/118, 501/119, 120, 153, 154; 55/523, 585.3, 483, 55/502, 529

See application file for complete search history.

(56) References Cited

U.S. PATENT DOCUMENTS 4,177,307 A * 12/1979 Torii et al. .................. 428/116

(Continued)

FOREIGN PATENT DOCUMENTS

CN         1149841 A      5/1997

(Continued)

OTHER PUBLICATIONS

Applicant's facsimille of the English translation of Table 3 of the Toshio reference.*

*Primary Examiner*—David R Sample
*Assistant Examiner*—Nicole T Gugliotta
(74) *Attorney, Agent, or Firm*—Oliff & Berridge, PLC

(57) ABSTRACT

There are provided a honeycomb structure capable of suppressing a decrease in isostatic strength attendant on the thinning of the honeycomb structure, a honeycomb structure converter thereof, and a method of manufacturing the honeycomb structure. There is provided a honeycomb structure 1 having a number of cells 3 partitioned by partition walls 2 and extending to a axial direction. There are the honeycomb structure wherein a thickness (TY) of a partition walls (2Y) whose longitudinal direction is one direction (Y-direction) in a section perpendicular to the axial direction of the honeycomb structure 1 is greater than that (TX) of a partition walls (2X) whose longitudinal direction is the other direction; and a honeycomb structure converter thereof. There is provided a method of molding the above-mentioned honeycomb structure, wherein the honeycomb structure is extrusion molded such that the Y-direction is a direction of gravity.

15 Claims, 11 Drawing Sheets

U.S. PATENT DOCUMENTS

| | | | | |
|---|---|---|---|---|
| 4,233,351 A | * | 11/1980 | Okumura et al. | 502/439 |
| 4,625,511 A | * | 12/1986 | Scheitlin et al. | 60/299 |
| 5,456,965 A | * | 10/1995 | Machida et al. | 428/116 |
| 5,514,354 A | * | 5/1996 | Domesle et al. | 423/213.5 |
| 5,575,980 A | * | 11/1996 | Turek | 422/181 |
| 5,866,080 A | * | 2/1999 | Day | 422/180 |
| 5,952,079 A | * | 9/1999 | Andou et al. | 428/116 |
| 6,309,590 B1 | * | 10/2001 | Obata et al. | 264/630 |
| 6,436,551 B1 | * | 8/2002 | Wieres | 428/593 |
| 6,696,130 B1 | * | 2/2004 | Kasai et al. | 428/116 |
| 6,773,580 B2 | * | 8/2004 | Boger et al. | 208/134 |
| 7,056,365 B2 | * | 6/2006 | Ichikawa et al. | 55/523 |
| 2001/0033910 A1 | * | 10/2001 | Ikeshima | 428/116 |
| 2001/0036427 A1 | | 11/2001 | Yamada et al. | |

FOREIGN PATENT DOCUMENTS

| | | |
|---|---|---|
| CN | 2298061 Y | 11/1998 |
| EP | 0 780 148 A1 | 6/1997 |
| JP | A 54-110189 | 8/1979 |
| JP | A 54-150406 | 11/1979 |
| JP | A 55-147154 | 11/1980 |
| JP | A 62-114633 | 5/1987 |
| JP | A 7-204500 | 8/1995 |
| JP | A 9-155189 | 6/1997 |
| JP | A-2001-280124 | 10/2001 |
| WO | WO 98/05602 | 2/1998 |

* cited by examiner

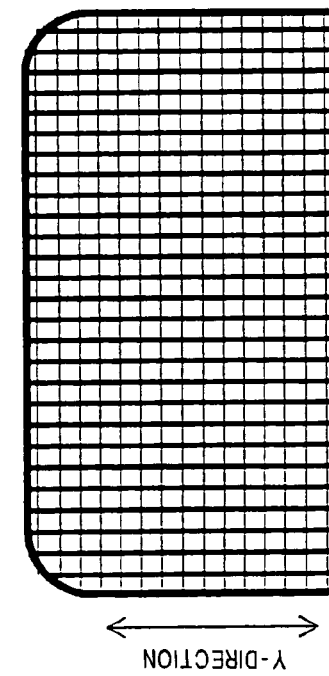
FIG.9
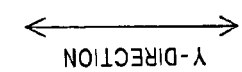
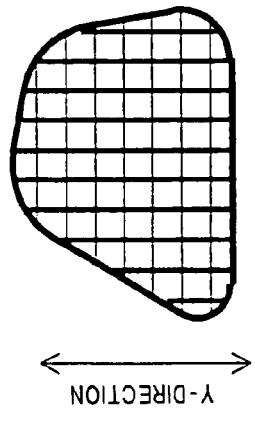
FIG.8
FIG.10

Y-DIRECTION

# HIGH STRENGTH HONEYCOMB STRUCTURE, METHOD OF MOLDING THE SAME, AND HONEYCOMB STRUCTURE CONVERTER

TECHNICAL FIELD

The present invention relates to a honeycomb structure having a high strength, particularly to a honeycomb structure which shows a satisfactory isostatic strength and/or canning strength even with a small average thickness of partition walls, and to a honeycomb structure converter using the honeycomb structure. The present invention further relates to a method of molding a honeycomb structure showing a satisfactory isostatic strength and/or canning strength.

BACKGROUND ART

A honeycomb structure has been broadly used in a filter, a catalyst carrier, and the like, especially frequently used as a catalyst carrier in a catalytic converter for purifying an exhaust gas of an internal combustion engine such as an automobile engine, as a filter for purifying an exhaust gas of a diesel engine, and the like.

When the honeycomb structure is used in the catalyst carrier in the catalytic converter for purifying the exhaust gas of an automobile, exhaust gas regulations have tended to be strengthened year by year out of considerations to environmental problems, and there has been a demand for enhancement of a purification performance of an exhaust gas purifying catalyst so as to cope with the problems. On the other hand, from the aspect of engine development, a direction of low fuel consumption with high output is remarkably indicated, and there has also been a demand for reducing pressure loss in an exhaust gas purifying catalyst in order to cope with this situation.

Therefore, to solve the problem, trends are growing toward reduction of the pressure loss by further thinning partition walls and an outer wall of the honeycomb structure to improve breathability and toward enhancement of the purification performance at the time of warming-up by reducing a weight of the exhaust gas purifying catalyst to reduce a heat capacity.

In such applications, the honeycomb structure is used by being held in a metal can or the like on contact with a holding material. In such use, the honeycomb structure need be held at certain strength so that there occurs no slippage between the honeycomb structure and the can. Thus an isostatic strength capable of withstanding the above strength is required. Inhibition of breakage when the structure is held by the can on contact with the holding material (hereinafter referred to as the canning) is also required. Therefore, it is necessary to suppress a decrease in isostatic strength and/or a decrease in resistance to the canning (hereinafter referred to as the canning strength) when the walls of the honeycomb structure become thinner by a demand for the reduction of the heat capacity. As means for solving the strength decrease of the honeycomb structure attendant on the thinning of the partition walls, a structure in which the thickness of the partition walls is regularly reduced toward a center of a cross section of a honeycomb carrier has been proposed for example, in JP-B-54-110189. Moreover, a structure in which a cell partition walls of an outer peripheral portion is formed to be thicker than that inside has been proposed in JP-A-54-150406 and JP-A-55-147154. However, the decrease in isostatic strength attendant on the further thinning of the partition walls cannot sufficiently be suppressed even by these structures, and the decrease in canning strength cannot effectively be suppressed.

Further in WO 98/05602 was proposed a ceramic honeycomb structure wherein the average cell wall thickness T is 0.05 to 0.13 mm, the average outer wall thickness is larger than T, W>T (W is an average width of contact between cell walls and outer wall), and $0.7 \geq -(T/4)+0.18$. However, although a certain effect is fulfilled in prevention of chipping at the time of handling in this ceramic honeycomb structure, the isostatic strength is not enhanced sufficiently, and the decrease in canning strength cannot effectively be suppressed.

DISCLOSURE OF THE PRESENT INVENTION

The present invention has been developed in consideration of the above-described problems heretofore, and aims at providing a honeycomb structure capable of suppressing a decrease in isostatic strength and/or canning strength attendant on the thinning of the honeycomb structure, and providing a honeycomb structure converter thereof.

Another aim of the present invention is to provide a molding method which can suppress a decrease in isostatic strength and/or canning strength in providing the honeycomb structure.

As a result of intensive studies by the present inventors, it has been found that a thickness (TY) of a partition walls whose longitudinal direction is one direction (Y-direction) in a section perpendicular to an axial direction of the honeycomb structure is greater than that of other partition walls, and accordingly the isostatic strength which is a strength against isotropic pressurizing is enhanced. Furthermore, it has been found that the thickness of the partition walls in a predetermined part of the partition walls whose longitudinal direction is the Y-direction, is increased, and accordingly breakage in the canning can be reduced.

That is, according to the present invention, there is provided a honeycomb structure comprising a number of cells partitioned by partition walls and extending through an axial direction, wherein a thickness (TY) of the partition walls whose longitudinal direction is one direction (Y-direction) in a section perpendicular to the axial direction of the honeycomb structure is greater than a thickness (TX) of the partition walls whose longitudinal direction is the other direction.

In the present invention, a relation between TX and TY is preferably $1.10 \leq TY/TX \leq 1.50$, and TX is preferably $10 \, \mu m \leq TX \leq 115 \, \mu m$. A ratio of an open frontal area of the honeycomb structure is preferably 60% to 95%. Furthermore, a sectional shape of the cell is preferably a polygonal shape, and the polygonal shape is further preferably one or more polygonal shapes selected from a group consisting of a square shape, a rectangular shape, a triangular shape, and a hexagonal shape. In the present invention, further the shape of the section perpendicular to the axial direction of the honeycomb structure is preferably an elliptic shape, an oval shape, or an irregular shape, and a short-diameter direction of the section is preferably the Y-direction, also the thickness of the partition walls in an outer peripheral portion of the honeycomb structure is preferably greater than that of the partition walls in an inner portion. Furthermore, the thickness of the partition walls in the outer peripheral portion of the honeycomb structure is preferably greater than that that of the partition walls in the inner portion. More preferably, the honeycomb structure has a cylindrical outer wall which surrounds the partition walls, and in a condition that, in the section perpendicular to the axial direction of the honeycomb structure, one intersection of the outer wall and one line extending in a direction of 35 degrees with respect to the Y-direction from a center of the section is a point $O_1$, one intersection of the outer wall and one line extending in a direction of 75 degrees with respect to the Y-direction from the center is a point $P_1$, one intersection of the outer wall and a line extending in the Y-direction from the point $O_1$ is a point $O_2$, and one intersection of the outer wall and a line extending in the Y-direction from the point $P_1$ is a point $P_2$, the thickness of at least some of the partition walls whose longitudinal direction is the Y-direction in a region surrounded with lines connecting the point $O_1$ to the point $P_1$ along the outer wall (a circular arc line), the point $P_1$ to the point $P_2$ (a straight line), the point $P_2$ to the point $O_2$ along the outer wall (a circular arc line), and the point $O_2$ to the point $O_1$ (a straight line) is greater than that of other partition walls. Also it is preferred that the honeycomb structure has an oval cylindrical or an elliptic cylindrical outer wall surrounding the partition walls, and the partition walls whose Y-direction in the section perpendicular to the axial direction of the honeycomb structure is a short-diameter direction of an oval or elliptic sectional shape; and in the condition that, in the section, one intersection of the outer wall and one line extending in a direction of 35 degrees with respect to the Y-direction from a center of the section is a point $O_1$, one intersection of the outer wall and one line extending in a direction of 85 degrees with respect to the Y-direction from the center is a point $P_1$, one intersection of the outer wall and a line extending in the Y-direction from the point $O_1$ is a point $O_2$, and one intersection of the outer wall and a line extending in the Y-direction from the point $P_1$ is a point $P_2$, the thickness of at least some of the partition walls whose longitudinal direction is the Y-direction in a region surrounded with lines connecting the point $O_1$ to the point $P_1$ along the outer wall (a circular arc line), the point $P_1$ to the point $P_2$ (a straight line), the point $P_2$ to the point $O_2$ along the outer wall (a circular arc line), and the point $O_2$ to the point $O_1$ (a straight line) is greater than that of other partition walls.

Furthermore, according to the present invention, there is provided a honeycomb structure converter in which the above-mentioned honeycomb structure having a number of cells partitioned by partition walls and extending through an axial direction is canned in a metallic case. In the honeycomb structure converter of the present invention, the honeycomb structure in which thickness of at least some of partition walls whose longitudinal direction is a Y-direction in the above-mentioned predetermined region is greater than those of other partition walls is also preferably canned by two divided metallic cases, and integrated.

Moreover, according to the present invention, there is provided a method of molding the above-mentioned honeycomb structure having a number of cells partitioned by partition walls and extending through an axial direction, the method comprising an extrusion molding such that the Y-direction is a direction of gravity.

BRIEF DESCRIPTION OF THE DRAWINGS

FIG. 8 shows another example of the sectional shape of the honeycomb structure of the present invention;

FIG. 9 shows another example of the sectional shape of the honeycomb structure of the present invention;

FIG. 10 shows another example of the sectional shape of the honeycomb structure of the present invention;

BEST MODE FOR CARRYING OUT THE INVENTION

The present invention will hereinafter be described based on preferable embodiments, but the present invention is not limited to the following embodiments. In the followings, "section" of a honeycomb structure means a section perpendicular to the axial direction of the honeycomb structure, unless otherwise specified.

Figure 1A:
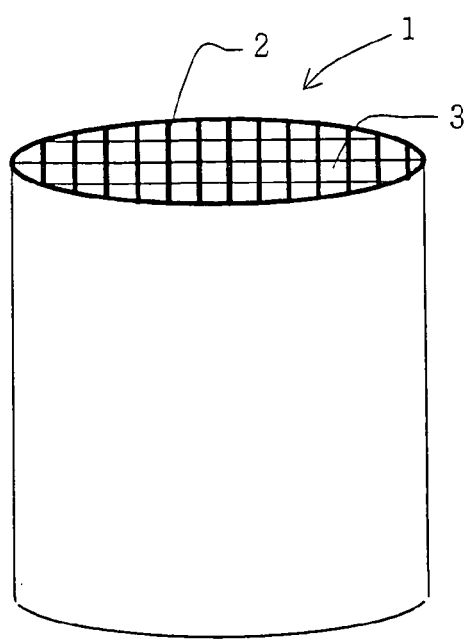
FIG. 1(a) is a schematic perspective view of a honeycomb structure according to one embodiment of the present invention.
Figure 1B:
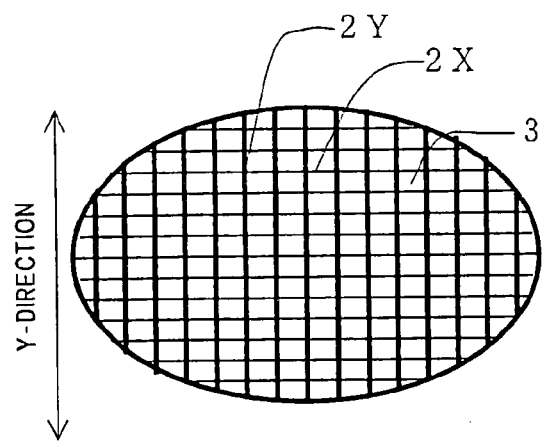
FIG. 1(b) is a schematic top plan view of the honeycomb structure of FIG. 1(a).
Figure 2A:
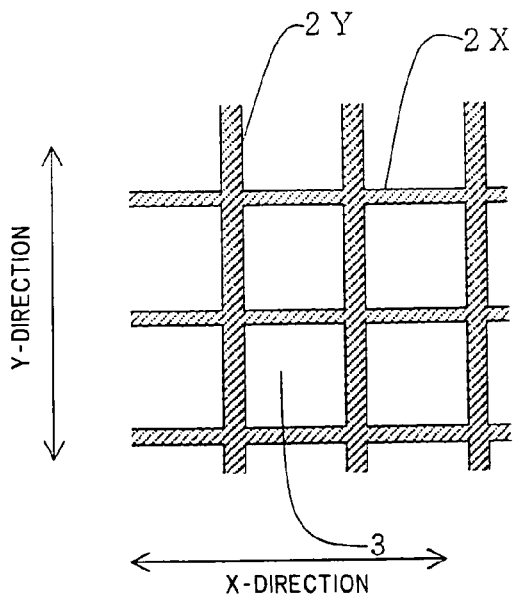
FIG. 2(a) is a schematic enlarged sectional view of the honeycomb structure of the present invention in which cells are square.
Figure 2B:
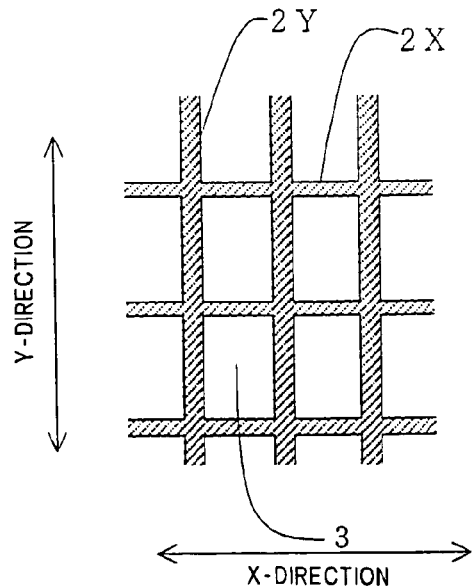
FIG. 2(b) is a schematic enlarged sectional view of the honeycomb structure of the present invention in which the cells are rectangular.
Figure 2C:
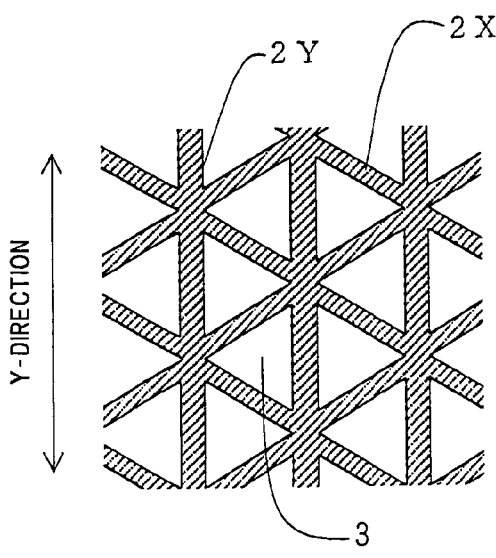
FIG. 2(c) is a schematic enlarged sectional view of the honeycomb structure of the present invention in which the cells are triangular.
Figure 2D:
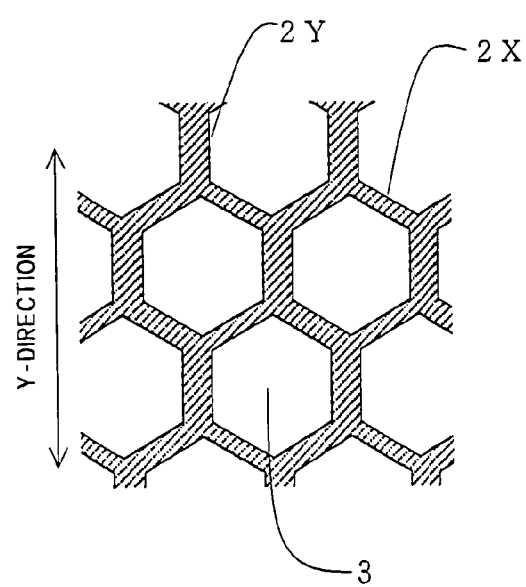
FIG. 2(d) is a schematic enlarged sectional view of the honeycomb structure of the present invention in which the cells are hexagonal.
Figure 5:
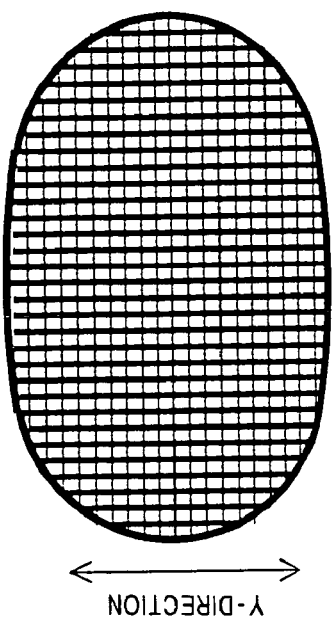
FIG. 5 shows another example of the sectional shape of the honeycomb structure of the present invention.
Figure 7:
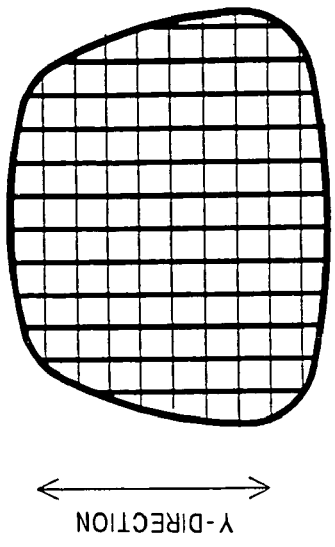
FIG. 7 shows another example of the sectional shape of the honeycomb structure of the present invention.
Figure 4:
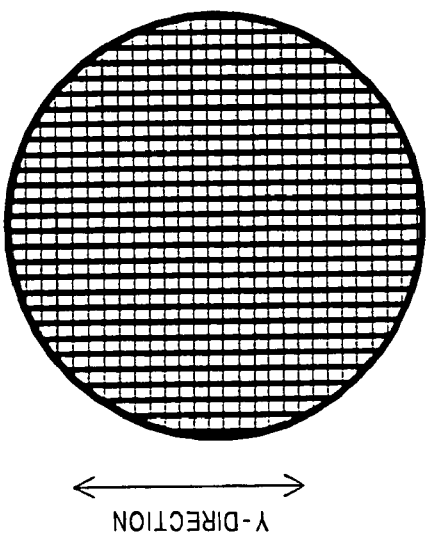
FIG. 4 shows one example of a sectional shape of the honeycomb structure of the present invention.
Figure 6:
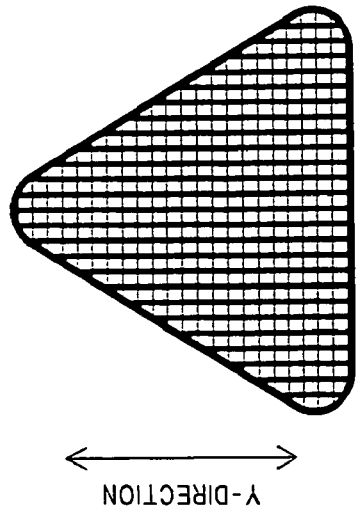
FIG. 6 shows another example of the sectional shape of the honeycomb structure of the present invention.

FIGS. 1(a), 1(b) are schematic diagrams showing one embodiment of a honeycomb structure according to the present invention. As shown in FIGS. 1(a), 1(b), a honeycomb structure 1 according to the present invention has a number of cells 3 partitioned by partition walls 2 and extending through an axial direction. An important characteristic of the present invention is that thickness of a partition walls 2Y whose longitudinal direction is one direction (Y-direction) is greater than that of partition walls 2X whose longitudinal direction is the other direction, for example, an X-direction in FIG. 2(b) in a section of the honeycomb structure. By constituting the honeycomb structure 1 in this manner, and preferably extrusion molding in such a manner that the Y-direction is a direction of gravity, an isostatic strength is enhanced. It is an amazing effect that thickening of a partition walls in one direction enhances the isostatic strength which is a strength against isostatic pressurizing from an outer periphery. A reason for this is supposedly that deformation of the partition walls 2 during the period between extruding and firing is inhibited by the above-described constitution to produce the honeycomb structure as designed, and therefore a stress concentration part by the deformation of the partition walls 2 can be eliminated.

A sectional shape of the cell 3 in the honeycomb structure of the present invention is not especially limited, but the sectional shape is preferably polygonal, because a total length of the partition walls whose longitudinal direction in the section is one direction can be secured by a certain or more ratio. Furthermore, as shown in FIGS. 2(*a*) to 2(*d*), when the section is square, rectangular, triangular, or hexagonal, the comparatively large total length of the partition walls whose longitudinal direction in the section is one direction can preferably be secured. Moreover, all the sectional shapes of the cells 3 do not have to be the same, and two or more different shapes may exist in one honeycomb structure.

In the present invention, when the sectional shape of the cell 3 is square or rectangular, as shown in FIG. 2(*a*) or 2(*b*), the partition walls whose longitudinal direction is any one direction are defined as 2Y, and the thickness of some or all of the walls may be set to be greater than that of the partition walls 2X whose longitudinal direction is the orthogonal direction (X-direction) to the direction of 2Y. When the sectional shape of the cell 3 is triangular, as shown in FIG. 2(*c*), the direction of any one side of one triangle is defined as Y, the partition walls whose longitudinal direction is the Y-direction, that is, the partition walls which correspond to the selected side, the partition walls which exist on an extended line, and the partition walls which extend in parallel with the side are defined as 2Y, and the thickness of some or all of the walls may be set to be greater than that of the partition walls 2X whose longitudinal directions are the other directions. As shown in FIG. 2*d*, when the sectional shape of the cell 3 is hexagonal, in the same manner as in the triangle, the direction of any one side of one hexagon is defined as Y, the partition walls whose longitudinal direction is the Y-direction that is, the partition walls which correspond to the selected side, the partition walls which exist on the extended line, and the partition walls which extend in parallel with the side are defined as 2Y, and the thickness of some or all of the walls may be set to be greater than that of the partition walls 2X whose longitudinal directions are the other directions.

Figure 3:
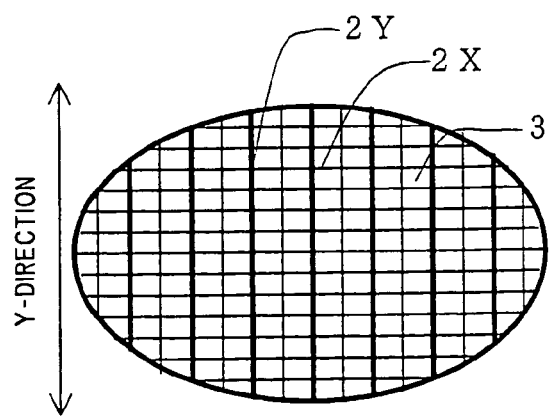
FIG. 3 is a schematic top plan view of the honeycomb structure according to another embodiment of the present invention.

In the present invention, the thickness (TY) of the partition walls 2Y whose longitudinal direction in the section is one direction (Y-direction) means the thickness of the given partition walls 2Y, and the thickness of the partition walls 2X whose longitudinal direction is the other direction means an average thickness of all the partition walls 2X whose longitudinal direction is the other direction. In the honeycomb structure of the present invention, the thickness of all the partition walls 2Y whose longitudinal direction is one direction is preferably greater than the average thickness of the partition walls 2X, but the thickness of some of the partition walls 2Y whose longitudinal direction is one direction may be greater than the average thickness of the partition walls 2X. In this case, as shown in FIG. 3, the thickness of a whole unit of partition walls is preferably thicker by taking partition walls continuing on one straight line as one unit. Moreover, the partition walls in a central part, that is, the longer partition walls continuing on a straight line are preferably thicker. As described later in detail, the thickness of the partition walls in a reinforcing part region in a predetermined range of positions deviating from the central part is preferably greater than that of the other partition walls.

In the honeycomb structure of the present invention, a ratio of TY to TX, that is, TY/TX is not especially limited as long as the ratio is greater than 1.0. However, when the ratio is too close to 1.0, the effect of the present invention can not be obtained. When the ratio is excessively large, a resistance to thermal shock is unfavorably deteriorated. For a preferable range, TY/TX is 1.10 or more, further preferably 1.15 or more, most preferably 1.20 or more and 1.50 or less, further preferably 1.45 or less, most preferably 1.40 or less. In this case, TX and all TY preferably satisfy the above-described relation, but some TY, for example, TY in the reinforcing part region described later preferably satisfies the above-described relation.

In the honeycomb structure of the present invention, the thickness (TX) of the partition walls whose longitudinal direction is a direction other than the Y-direction is not especially limited. However, when the thickness is too small, it becomes difficult to extrude even the honeycomb structure of the present invention. When the thickness is too large, a sufficient isostatic strength is easily obtained even with a structure other than the honeycomb structure of the present invention, and the effect of the present invention is not easily obtained. For a preferable range, TX is 10 μm or more, further preferably 20 μm or more, most preferably 30 μm or more, and 115 μm or less, further preferably 100 μm or less, most preferably 95 μm or less.

In the honeycomb structure of the present invention, a cell density is not especially limited. However, when the cell density is too large, the number of partition walls per unit sectional area increases. Even with the structure other than the honeycomb structure of the present invention, the partition walls are not easily deformed, a sufficient isostatic strength can be easily obtained, and the effect of the present invention is not easily obtained. Similarly, the ratio of the open frontal area is not limited. However, when the ratio of the open frontal area is too large, the sufficient strength is not obtained even with the honeycomb structure of the present invention. When the ratio of the open frontal area is too small, a performance as a catalyst carrier unfavorably drops. The ratio of the open frontal area is preferably 60 to 95%, further preferably 65% to 92%, most preferably 70% to 89%.

As the sectional shape of the honeycomb structure 1 of the present invention, for example, in addition to the elliptic shape shown in FIG. 1(*b*), a circular shape, an oval shape (racetrack shape), or irregular shapes such as a substantially triangular shape, a substantially trapezoidal shape, a substantially quadrangular shape, and an asymmetric shape may be constituted. Above all, the elliptic, oval, or irregular shape has short and long diameters, and is therefore preferable as the shape to which the present invention is applied. With the elliptic, oval, or irregular shape, a long-diameter direction of the section may also be defined as the Y-direction, but it is preferable to define the short-diameter direction as the Y-direction for the enhancement of the isostatic strength.

Figures 11A, 11B:
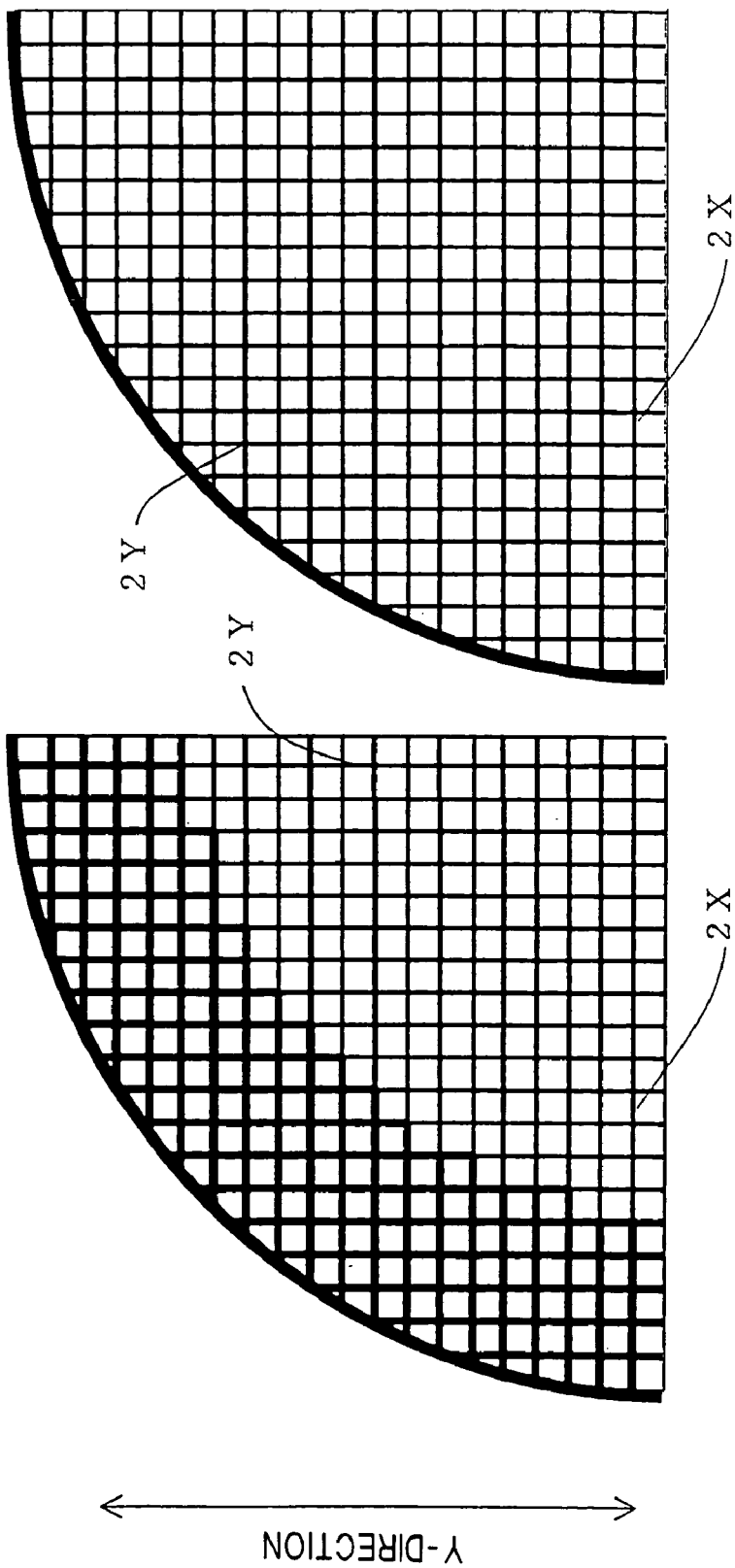
FIGS. 11(a) and 11(b) are schematic enlarged sectional views showing preferable examples of the honeycomb structure of the present invention.

Moreover, as shown in FIGS. 11(*a*) and 11(*b*), the thickness of the partition walls in the outer peripheral portion of the honeycomb structure is preferably set to be greater than that of the partition walls in the inner portion from a viewpoint of enhancement of the canning strength. Here, an outer wall of the honeycomb structure is also included in the partition walls. In this case, as shown in FIG. 11(*b*), only the thickness of the outer wall of the honeycomb structure may be increased. Moreover, as shown in FIG. 11(*a*), the thickness of the partition walls surrounding the several cells from outer peripheral side may be increased. It is to be noted that in FIGS. 11(a) and 11(b), needless to say, the thickness of 2Y is greater than that of 2X. A range in which the thickness of the partition walls of the outer peripheral portion is increased is preferably a range from a first to 15th cell from the outer peripheral side, further preferably a range from a first to a tenth cell. Within this range, the thickness of the given partition walls may be increased, but the thickness of several partition walls from an outer wall side is preferably increased. Preferable concrete examples include an example in which the cell contacting the outer wall, that is, an outermost cell $3_{a1}$ in the section is taken as a first cell, the thickness of the partition walls 2 surrounding each of three consecutive cells toward an inner side, that is, cells $3_{a1}$ to $3_{a3}$ are set to about 80 μm, and the thickness of other partition walls, that is, the partition walls inside the partition walls with the thickness of 80 μm, is set to 50 μm. As another example, there can be mentioned that the thickness of the partition walls 2 surrounding each of the cells $3_{a1}$ to $3_{a3}$ is set to about 80 to 100 μm, the thickness of the partition walls 2 surrounding each of fourth to sixth consecutive cells $3_{a4}$ to $3_{a6}$ inwardly is set to about 60 to 80 μm, the thickness of the partition walls 2 surrounding each of consecutive seventh to tenth cells $3_{a7}$ to $3_{a10}$ inwardly is set to about 50 to 60 μm, the thickness of an inner partition walls is set to about 50 μm, and the partition wall thickness is successively reduced inwardly from the outer peripheral side in this manner. Further there can be mentioned that the thickness of the partition walls 2 surrounding each of the cells $3_{a1}$ to $3_{a10}$ is set to 80 μm, and the thickness of the inner partition walls is set to 50 μm.

Figure 12:
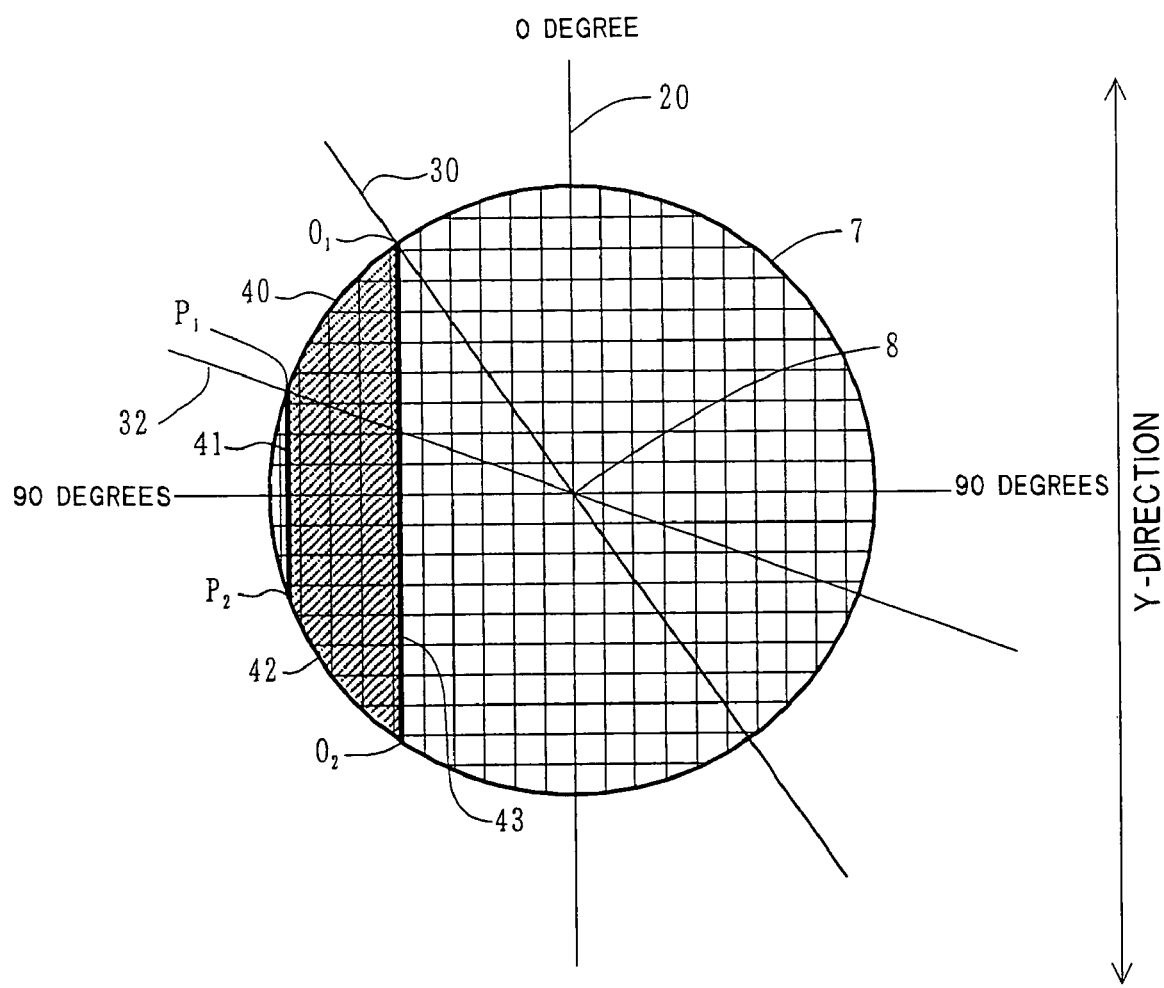
FIG. 12 is a schematic sectional view showing another example of the honeycomb structure in the present invention.

Moreover, as another preferable embodiment in the honeycomb structure of the present invention, for example, as shown in FIG. 12, the honeycomb structure 1 has a cylindrical outer wall 7 surrounding the partition walls. In the section shown in FIG. 12, defining that one intersection of the outer wall 7 and one line 30 extending in a direction of 35 degrees with respect to the Y-direction from a sectional center 8 is a point $O_1$, one intersection of the outer wall 7 and one line 32 extending in a direction of 75 degrees with respect to the Y-direction from the sectional center 8 is a point $P_1$, one intersection of the outer wall 7 and a line 43 extending in the Y-direction from the point $O_1$ is a point $O_2$, and one intersection of the outer wall 7 and a line 41 extending in the Y-direction from the point $P_1$ is a point $P_2$, the thickness of at least some of the partition walls 2Y whose longitudinal direction is the Y-direction in a region surrounded with lines connecting the point $O_1$ to the point $P_1$ along the outer wall (a circular arc line 40), the point $P_1$ to the point $P_2$ (a straight line 41), the point $P_2$ to the point $O_2$ along the outer wall (a circular arc line 42), and the point $O_2$ to the point $O_1$ (a straight line 43) is greater than that of other partition walls, that is, in a shaded portion (hereinafter referred to as the reinforcing part region) in FIG. 12 are greater than those of the other partition walls, that is, the partition walls whose longitudinal direction is the other direction and the partition walls positioned outside the above-described region whose longitudinal direction is the Y-direction. The partition walls 2Y in the reinforcing part region whose longitudinal direction is the Y-direction will hereinafter be referred to as partition walls $2Y_r$, and an average thickness of the partition walls $2Y_r$ will be referred to as $HY_r$.

Figure 14:
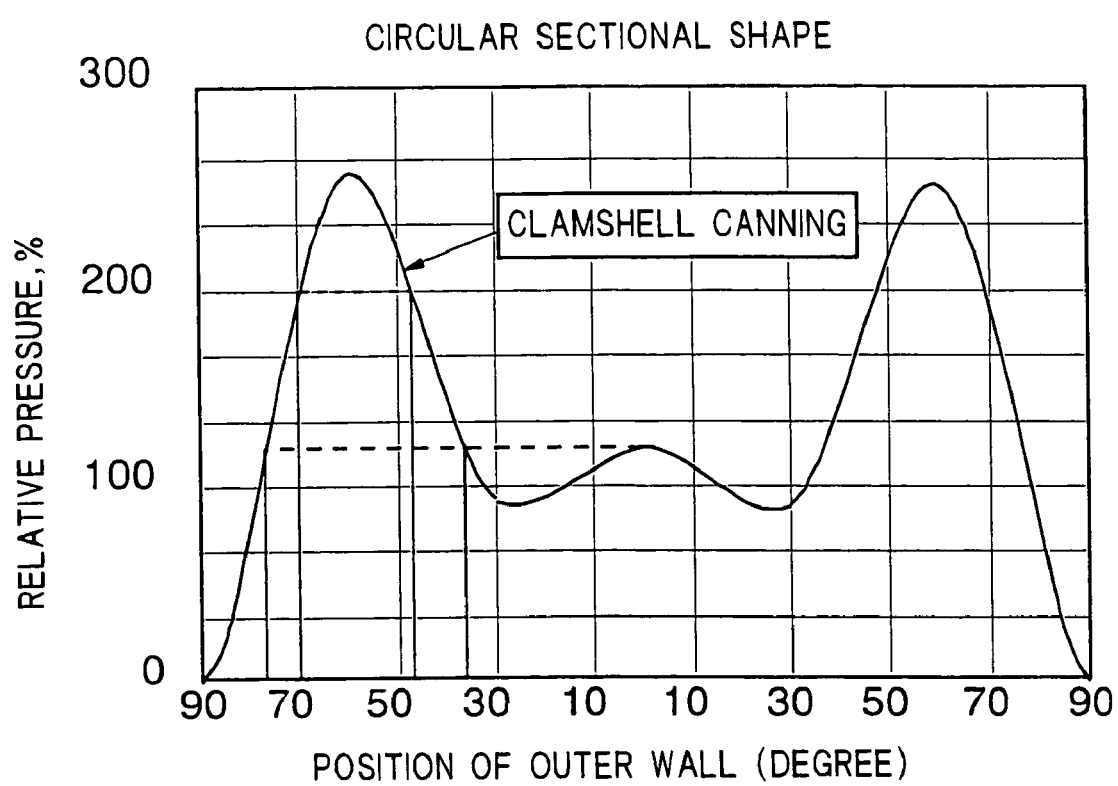
FIG. 14 is a graph showing one example of a pressure distribution of the honeycomb structure at the time of canning of the honeycomb structure.
Figure 18:
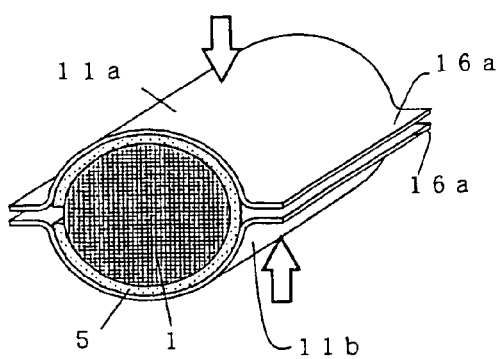
FIG. 18 is a perspective view showing one example of the clamshell method used for accommodating a cell structure in a metallic container.

For example, as shown in FIG. 18, when the honeycomb structure is accommodated, that is, canned by two divided metallic containers 11a and 11b via a compressive elastic material 5, a compressive stress is applied in a vertical direction with respect to the honeycomb structure in FIG. 18, that is, an arrow direction. It has been revealed that the stress becomes very high in a specific position of the honeycomb structure as shown in FIG. 14. FIG. 14 shows a relative stress strength in the position of each outer wall in a case where the position of the outer wall in the vertical direction from the sectional center of the honeycomb structure in FIG. 18 is taken as 0 degree, and the position of the outer wall in a horizontal direction from the sectional center, that is, a bonded portion of two divided metallic container, is 90 degrees.

As seen from FIG. 14, for example, in the honeycomb structure shown in FIG. 12, the structure is canned in two divided metallic containers 11a, 11b in such a manner that the Y-direction of the partition walls 2Y is the vertical direction in FIG. 18, that is, a compression direction shown by an arrow, and the partition walls $2Y_r$ is disposed in a position under a large stress. Accordingly, breakage of the honeycomb structure at the time of or after the canning can be inhibited.

In FIG. 12, a broader reinforcing region is preferable from a viewpoint of the enhancement of the compressive stress, but a narrower range is preferable from a viewpoint of the thinning of the whole partition walls. Therefore, an angle indicating the point $O_1$ (hereinafter referred to as the angle of the point $O_1$), that is, an angle formed by the line extending to the point $O_1$ from the sectional center 8 and a line 20 extending in the Y-direction (i.e., the direction of 0 degree) from the sectional center 8 is preferably 35 degrees, further preferably 45 degrees, especially preferably 50 degrees. Similarly, an angle indicating the point $P_1$ (hereinafter referred to as the angle of the point $P_1$), that is, an angle formed by the line extending to the point $P_1$ from the sectional center 8 and the line 20 extending in the Y-direction (i.e., the direction of 0 degree) from the sectional center 8 is preferably 75 degrees, further preferably 70 degrees, especially preferably 65 degrees. Some of the partition walls $2Y_r$ may be thickened, and all of them may also be thickened. For the reinforcing part region, two left and right places may be disposed in FIG. 12. When at least some of the partition walls $2Y_r$ in either one reinforcing part range are thick, a certain degree of effect is obtained. At least some of the partition walls $2Y_r$ in both the reinforcing part regions are preferably thick.

Figure 13:
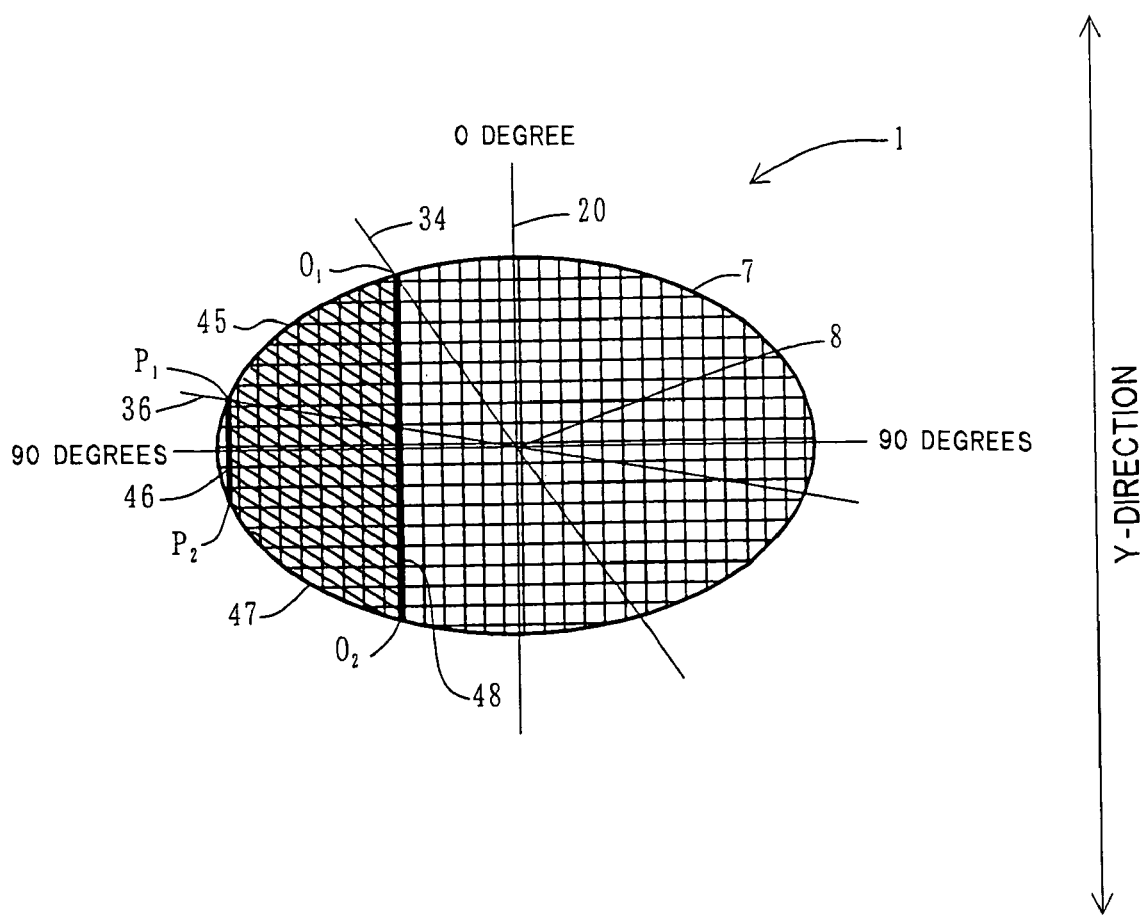
FIG. 13 is a schematic sectional view showing another example of the honeycomb structure in the present invention.
Figure 15:
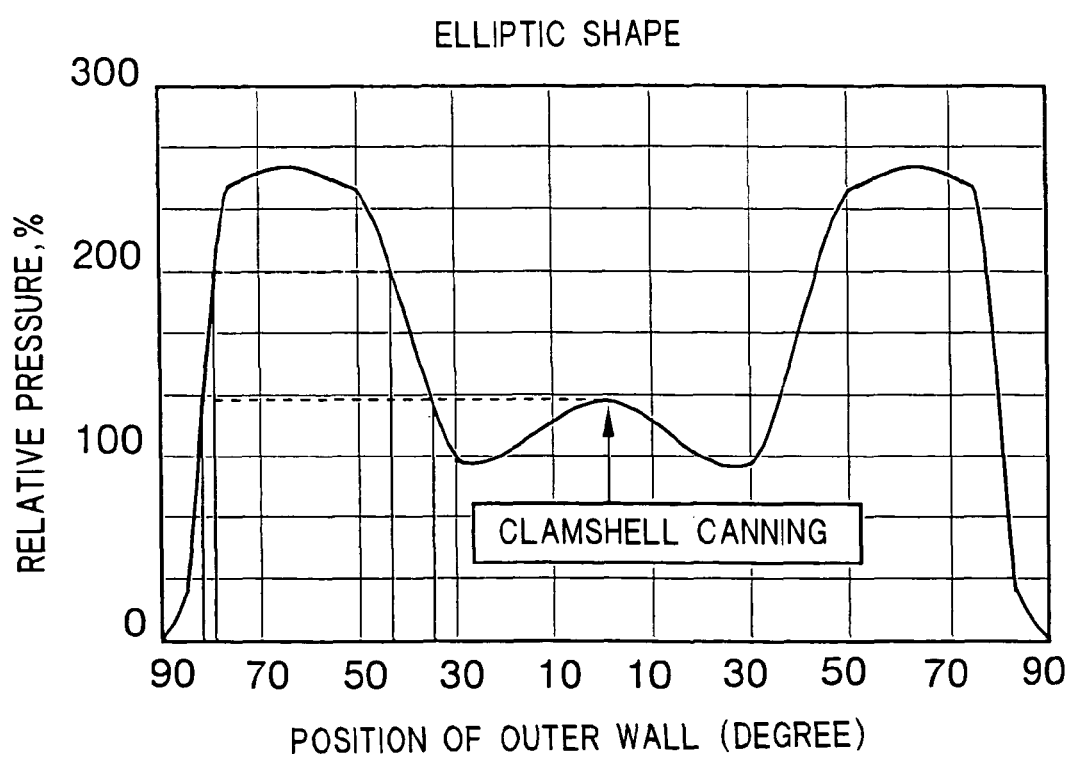
FIG. 15 is a graph showing another example of the pressure distribution of the honeycomb structure at the time of the canning of the honeycomb structure.

An example in which the stress distribution is measured in the same manner as in FIG. 14 is shown in FIG. 15 in a case where the honeycomb structure has the oval cylindrical or elliptic cylindrical outer wall, that is, where the sectional shape of the honeycomb structure is oval or elliptic. It has been revealed that a large stress is applied to the outer peripheral portion positioned at 35 to 85 degrees, further 40 to 80 degrees with the oval or ellipse. Therefore, as shown in FIG. 13, the honeycomb structure 1 has the partition walls whose Y-direction in the section is the short-diameter direction of the oval or elliptic sectional shape, that is, the direction of 0 degree. Defining that one intersection of the outer wall 7 and one line 34 extending in a direction of 35 degrees with respect to the Y-direction from a sectional center 8 is a point $O_1$, one intersection of the outer wall 7 and one line 36 extending in a direction of 85 degrees with respect to the Y-direction from the sectional center 8 is a point $P_1$, one intersection of the outer wall 7 and a line 48 extending in the Y-direction from the point $O_1$ is a point $O_2$, and one intersection of the outer wall 7 and a line 46 extending in the Y-direction from the point $P_1$ is a point $P_2$, the thickness of at least some of the partition walls $2Y_r$, among the partition walls in a region surrounded with lines connecting the point $O_1$ to the point $P_1$ along the outer wall (a circular arc line 45), the point $P_1$ to the point $P_2$ (a straight line 46), the point $P_2$ to the point $O_2$ along the outer wall (a circular arc line 47), and the point $O_2$ to the point $O_1$ (a straight line 48), that is, in the reinforcing part region shown by the shade portion is preferably greater than that of the other partition walls.

In this case, for reasons similar to those of the circular section, the angle of the point $O_1$ is preferably 35 degrees, further preferably 40 degrees, especially preferably 50 degrees. The angle of the point $P_1$ is preferably 85 degrees, further preferably 80 degrees. Moreover, some or all of the partition walls $2Y_r$ in the reinforcing part range may be thickened. For the reinforcing part range, two left and right places may be disposed in FIG. 13. When at least some of the partition walls $2Y_r$ in either one reinforcing part region are thick, the certain degree of effect is obtained, but at least some of the partition walls in both the reinforcing part regions are preferably thick.

In the embodiment shown in FIG. 12 or 13, even when some of TY/TX indicate a small value, the effect of the canning strength enhancement is obtained. Further in the honeycomb structure of the present invention, the thickness of the partition walls in the axial direction is generally constant, and preferably constant. However, even when the thickness is not constant, such a range of the axial direction that the effect of the present invention is obtained may be in the scope of the present invention.

Figure 16:
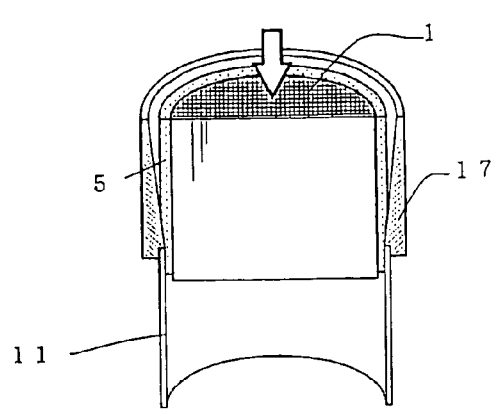
FIG. 16 is a partially cut-away view showing one example of the stuffing method used for stuffing a cell structure in a metallic container.
Figure 17:
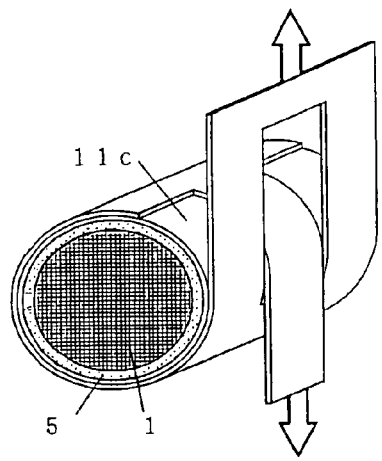
FIG. 17 is a perspective view showing one example of the tourniquet method used for accommodating a cell structure in a metallic container.

The honeycomb structure of the present invention is preferably used for purifying an exhaust gas of an internal combustion engine especially of an automobile or the like, but may also be used in various applications such as various filters and catalyst carrier. The honeycomb structure of the present invention can be accommodated in a catalytic converter container by canning to use as a honeycomb structure converter. In this case, it is preferable to can the honeycomb structure 1 together with the compressive elastic material 5 in a compressed state in a metallic container 1. As the specific canning method, there are suitably used a stuffing method shown in FIG. 16, using a guide 17; a tourniquet method shown in FIG. 17, which comprises winding a metallic plate 11c around a honeycomb structure, pulling the plate to impart a pressure to the outer surface of the honeycomb structure, and welding and fixing the to-be-jointed areas of the metallic plate 11c; and a clamshell method shown in FIG. 18, which comprises interposing a honeycomb structure between two metallic container parts 11a and 11b with applying a load to the parts 11a and 11b, and welding the to-be-bonded areas (flanges) 16a and 16b of the parts 11a and 11b to obtain a integrated container.

Examples of a material of the honeycomb structure of the present invention preferably include one or more ceramics selected from a group consisting of cordierite, mullite, alumina, spinel, silicon carbide, silicon nitride, lithium aluminum silicate, aluminum titanate, zirconia, and a combination thereof. Here, silicon carbide includes one constituted of metal silicon and silicon carbide. In these, cordierite is small in thermal expansion coefficient, is preferably used as the material of the honeycomb structure for purifying the exhaust gas of a automobile engine, and is especially preferable also in the present invention.

A method of manufacturing the honeycomb structure of the present invention is not especially limited. For example, a binder and the like are mixed in a powder of the above-described material, and the material can be molded in a certain shape by injection molding or extrusion molding and thereafter dried and fired to produce the structure. Above all, the material is preferably molded by the extrusion molding.

For example, for a honeycomb structure made of cordierite, puddle is obtained by adding, as a pore forming agent, 15 to 25 parts by weight of graphite and 5 to 15 parts by weight of synthetic resins such as PET, PMMA, cross-linked polystyrene, and phenol resin to 100 parts by weight of a raw material for cordierite obtained by blending, at predetermined proportions, talc, kaolin, calcinated kaolin, alumina, aluminum hydroxide and silica so as to give a chemical composition of $SiO_2$ (42 to 56% by weight), $Al_2O_3$ (30 to 45% by weight) and MgO (12 to 16% by weight), adding required amounts of a type of methyl cellulose and a surfactant, adding water appropriately, kneading them. Next, the puddle is subjected to vacuum deaeration and then to extrusion into a honeycomb structure. The honeycomb structure is subjected to drying by dielectric drying, microwave drying or hot air drying, and then to degreasing and firing by heating step at a maximum temperature of 1400 to 1435° C. The honeycomb structure can be made by above-described steps.

Next, the invention of a method of molding the honeycomb structure will be described. According to the molding method of the present invention, there is provided an extrusion method suitable for molding the above-described honeycomb structure. The molding method of the present invention is characterized by the extrusion molding such that the Y-direction in the above-described honeycomb structure is the direction of gravity, that is, perpendicular. Accordingly, even when the partition walls are thin in their entirety, the strength of the thicker partition walls 2Y is higher, therefore deformation by its own weight at the time of extrusion can be inhibited, a stress concentrated place can be inhibited from being generated, and the deterioration of the isostatic strength can be suppressed.

Figure 19:
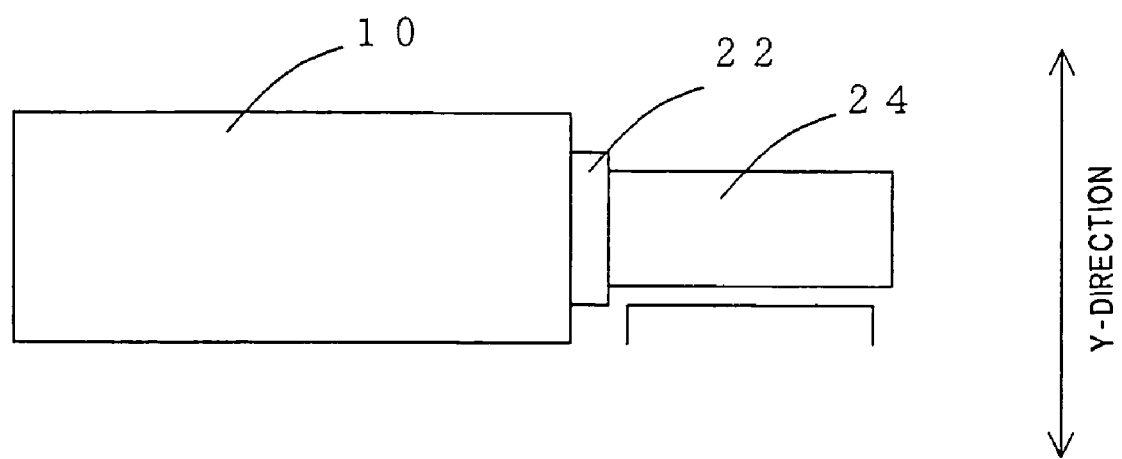
FIG. 19 is a schematic side view showing one example of an extrusion molding device for use in a molding method of the present invention.

FIG. 19 is a schematic side view of an extrusion molding device preferably usable in the extrusion molding of the present invention. The puddle in an extruder 10 is extruded in a horizontal direction through a die 22 to form a honeycomb molded body 24. The honeycomb molded body 24 immediately after extrusion is large in plasticity. When the partition walls are thin, deformation and buckling of the partition walls are easily occurred by its own weight. Here, the extrusion was carried out in such a manner that the Y-direction is the direction of gravity, that is, the thicker partition walls 2Y are in perpendicular. Accordingly, the strength of the direction of gravity becomes higher, and deformation and buckling of the partition walls can be inhibited.

The molding device for use in the present invention is not especially limited as long as the device is capable of heating and pressurizing and has an extrusion function, and an extruder of a plunger type, a pug mill, a single screw continuous extruder, a twin screw continuous extruder, or the like is usable.

Further in the present invention, the kneading and the molding can simultaneously be carried out by twin screw continuous extruder capable of simultaneously effecting the kneading and the molding. Temperature control device of the molding device is not especially limited. For example, temperature may also be controlled by a heater, heat medium circulation by oil, or a combination thereof.

In the present invention, a method of cooling the molded body extruded from the die 22 is not especially limited, and the methods such as air cooling, and water cooling by spraying are usable. The molded body may also be passed in water and quenched. It is to be noted that depending on a molding temperature, extruding speed, type and amount of additives, in the extruding method of the present invention the honeycomb structure can be obtained as designed without any deformation of the partition walls in the cooling at room temperature without forced cooling.

The cooling temperature immediately after the extrusion from the die 22 may be a temperature at which the binder is solidified. From a viewpoint of reduction of a stress at the time of the cooling, a difference between the molding temperature and the cooling temperature is preferably small, and a lower cooling speed is better. When a thermoplastic material is used as the binder, the material is cooled/solidified by a temperature drop. Therefore, when only the surface is firmly solidified, there is a possibility that a crack defect is generated at cell in inner portion in which a temperature is high. In the molding method of the present invention, even when the difference between the molding temperature and the cooling temperature is small; the honeycomb structure is easily obtained as designed without any deformation of the partition walls, and inner cracks are also advantageously inhibited from being generated.

In the manufacturing of the honeycomb structure of the present invention, a kneading equipment usable in a kneading step is not especially limited as long as the equipment is capable of heating and pressurizing, and a general kneader, a pressurizing kneader, a twin screw continuous kneading extruder, and the like are usable.

In the continuous molding, the binder needs to be formed into particulates, and methods of forming the particulates such as using a spray drier and freezing crushing can be applied.

For firing of the molded body, in a low temperature rage, the condition that a cell breakage does not occur is selected referring a dissipation curve of the binder, and in a high temperature range, the condition that target characteristics such as a porosity and thermal expansion coefficient can be obtained is selected.

Moreover, for the degreasing and firing of the honeycomb molded body, atmospheric air, inert atmosphere, vacuum, or the like may appropriately be selected depending on the type of the raw material powder.

For example, for a cordierite composition mixed powder which is an oxide, after degreasing in the atmospheric air, firing is carried out in the atmospheric air, and usually degreasing and firing are carried out simultaneously by using a batch type kiln or continuous kiln such as a tunnel kiln or the like.

When the honeycomb structure manufactured as described above is used in the catalyst for the automobile exhaust gas, a γ alumina layer is formed on the surface in a cell passage, and a noble metal component such as platinum, rhodium, and palladium which is catalyst component is loaded on the γ alumina layer. Thereafter, the catalyst is fired at a temperature around 600° C.

The present invention will hereinafter be described in detail in accordance with examples, but the present invention is not limited to these examples.

As Examples 1 to 6 and Comparative Example 1, a cylindrical cordierite honeycomb structures with the sectional shape of the cells being square, the cell density being 62 cells/cm$^2$ (400 cells/in$^2$), the average thickness (TX) of the partition walls extending in the horizontal direction at the time of extrusion being 88.9 μm (3.5 mil), and the whole sectional shape being circular of 86 mm in diameter were made.

EXAMPLE 1

A predetermined amount of each of raw material powders of talc, kaolin, and aluminum hydroxide was weighed, and thereafter mixed to obtain a raw material batch. Next, in the kneading step, 4% by mass of methyl cellulose with respect to 100% by mass of the raw material batch, and additive water were added to the obtained raw material batch, and kneaded by a kneading device to obtain the kneaded material. The temperature of the kneading device was controlled so as to keep the kneaded material at 10° C. in this kneading step. Next, the obtained kneaded material was deaerated through a vacuum chamber, and kneaded again to prepare a columnar puddle. The columnar puddle was charged into the extrusion molding machine, and extruded in such a manner that the Y-direction was the direction of gravity (perpendicular direction) and the axial direction is the horizontal direction to obtain a honeycomb molded body A. Next, moisture of the honeycomb molded body A was removed by dielectric drying and hot air drying. Thereafter, the body was degreased and fired on conditions that a maximum temperature was at about 1450° C. and a maximum temperature holding time was eight hours, and the honeycomb structure A was obtained in which the thickness (TY) of the partition walls in the Y-direction was about 100 μm (about 3.85 mil), that is, TY/TX was 1.1.

EXAMPLES 2 TO 6

Honeycomb structures B to F were prepared as Examples 2 to 6 in the same manner as in Example 1 except that the respective thicknesses (TY) of all the partition walls indicating the perpendicular direction at the time of extrusion were set to about 107 μm (about 4.2 mil), about 115 μm (about 4.5 mil), about 125 μm (about 4.9 mil), about 135 μm (about 5.2 mil), and about 142 μm (about 5.6 mil).

COMPARATIVE EXAMPLE 1

A honeycomb structure G was prepared in the same manner as in Example 1 except that the thickness of all the partition walls were set to 88.9 μm (3.5 mil), that is, TY/TX was set to 1.0.

(Evaluation of Deformation of Partition Walls)

The partition walls of the honeycomb structures A to G obtained in Examples 1 to 6 and Comparative Example 1 were observed by a universal projector to evaluate the deformation of the partition walls. The structure whose deformation was not confirmed was marked as ○, and the structure whose deformation was confirmed was marked as X. Results are shown in Table 1. The deformation was seen only in the partition walls of the honeycomb structure G of the Comparative Example 1, and the deformation was not seen in the partition walls of the honeycomb structures A to F of Examples 1 to 6.

TABLE 1

|  | TY μm (mil) | TX μm (mil) | TY/TX | Deformation of partition walls | Isostatic strength | ESP |
| --- | --- | --- | --- | --- | --- | --- |
| Example 1 | 100 (3.85) | 90 (3.5) | 1.1 | ○ | ○ | ○ |
| Example 2 | 107 (4.2) | 90 (3.5) | 1.2 | ○ | ○ | ○ |
| Example 3 | 115 (4.5) | 90 (3.5) | 1.3 | ○ | ○ | ○ |
| Example 4 | 125 (4.9) | 90 (3.5) | 1.4 | ○ | ○ | ○ |
| Example 5 | 135 (5.2) | 90 (3.5) | 1.5 | ○ | ○ | ○ |

TABLE 1-continued

| | TY μm (mil) | TX μm (mil) | TY/TX | Deformation of partition walls | Isostatic strength | ESP |
|---|---|---|---|---|---|---|
| Example 6 | 142 (5.6) | 90 (3.5) | 1.6 | ○ | ○ | X |
| Comparative Example 1 | 90 (3.5) | 90 (3.5) | 1.0 | X | X | ○ |

(Evaluation of Isostatic Strength)

Isostatic strength was tested and evaluated according to JASO standard M505-87 issued by Society of Automotive Engineers of Japan. In this test, the honeycomb structure is placed in a rubber cylindrical container, and covered with a lid of an aluminum plate to compress by isotropic pressurizing in water, and this test is a simulation for a compression load applied to the honeycomb structure in case where the honeycomb structure is held at the outer peripheral surface in a can member of the converter. The structure that withstood a pressure of 10 kgf/cm² was marked as ○, and the structure that did not withstand the pressure and was destroyed was marked as X. The results are shown in Table 1. Only the honeycomb structure G of Comparative Example 1 did not withstand the pressure of 10 kgf/cm² and was destroyed, but the honeycomb structures A to F of Examples 1 to 6 were not destroyed even by the pressure of 10 kgf/cm².

(Evaluation of Electric Furnace Spalling Properties (ESP))

After placing the honeycomb structure of room temperature in an electric furnace held at a temperature higher than room temperature by a predetermined temperature and keeping the structure in the furnace for 20 minutes, the honeycomb structure was taken out onto a fireproof brick and left to stand for 15 minutes. Thereafter, the structure was cooled to room temperature. Appearance was observed and the outer peripheral portion of the honeycomb structure was tapped with a metallic rod to evaluate the resistance to thermal shock. Any crack was not observed in the honeycomb structure, a tapping sound was not a dull sound but a metallic sound, and this was evaluated as acceptable one. The similar inspection was repeated successively every increase step at 50° C. until a temperature in the furnace was at 700° C. The structure in which any abnormality was not observed in the appearance and tapping sound even at 700° C. C was marked as ○, and the structure in which the abnormality was observed in the appearance and tapping sound at 700° C. or below was marked as X. The results are shown in Table 1. The cracks were confirmed only in the honeycomb structure F of Example 6 until the temperature arrived at 700° C., but any crack was not confirmed in the other honeycomb structures even at 700° C. Since the difference in the thickness of the partition walls was too large in the honeycomb structure F, a drop in the resistance to thermal shock was indicated.

EXAMPLES 7 TO 10, COMPARATIVE EXAMPLE 2

The honeycomb structure was prepared in the same manner as in Example 1 except that the sectional shape of the honeycomb structure was made to a circular shape having a diameter of 118.4 mm and a length of 100 mm, and thicknesses $TY_r$ of the partition walls $2Y_r$ in the reinforcing part region in which the angles of the points $O_1$ and $P_1$ were set as shown in Table 2 and the thicknesses of the other partition walls were set as shown in Table 2. It is to be noted that the thicknesses of all the partition walls of the partition walls $2Y_r$ and those of all the other partition walls were set to be constant, respectively.

EXAMPLE 11 AND COMPARATIVE EXAMPLE 3

The honeycomb structure was prepared in the same manner as in Example 7 except that the sectional shape of the honeycomb structure was made to a circular shape having a diameter of 118.4 mm and a length of 100 mm, the cell density was set to 93 cells/cm² (600 cells/in²), and the angles of the points $O_1$ and $P_1$ and the partition wall thicknesses were set as shown in Table 2.

EXAMPLE 12 AND COMPARATIVE EXAMPLE 4

The honeycomb structure was prepared in the same manner as in Example 7 except that the sectional shape of the honeycomb structure was made to the circular shape having a diameter of 143.8 mm and a length of 100 mm, and the angles of the points $O_1$ and $P_1$ were set to the angles shown in Table 2.

EXAMPLE 13 AND 14

The honeycomb structure was prepared in the same manner as in Example 7 except that the sectional shape of the honeycomb structure was made to an elliptic shape having a long diameter of 125.0 mm, a short diameter of 80.0 mm, and a length of 100 mm, and the angles of the points $O_1$ and $P_1$ and the partition wall thicknesses were set to the angles and thicknesses shown in Table 2.

EXAMPLES 15, 16 AND COMPARATIVE EXAMPLE 5

The honeycomb structure was prepared in the same manner as in Example 7 except that the sectional shape of the honeycomb structure was made to an elliptic shape having a long diameter of 147.0 mm, a short diameter of 95.0 mm, and a length of 100 mm, and the angles of the points $O_1$ and $P_1$ and the partition wall thicknesses were set to the angles and thicknesses shown in Table 2.

EXAMPLES 17, 18 AND COMPARATIVE EXAMPLE 6

The honeycomb structure was prepared in the same manner as in Example 7 except that the sectional shape of the honeycomb structure was made to an elliptic shape having a long diameter of 169.7 mm, a short diameter of 80.8 mm, and a length of 100 mm, and the angles of the points $O_1$ and $P_1$ and the partition wall thicknesses were set to the angles and thicknesses shown in Table 2.

(Canning Test)

The honeycomb structures obtained in Examples 7 to 18 and Comparative Examples 2 to 6 were canned using two divided metallic containers 11a, 11b shown in FIG. 18 via the compressive elastic material 5 by the clamshell method, and it was checked whether or not the honeycomb structure was broken by the pressure at the time of the canning. The results are shown in Table 2.

TABLE 2

|  | Sectional shape Diameter (mm), shape | Cell density (cell number/in²) | Partition wall thickness (µm) | | Reinforcing part range (degree) | | Canning test |
|---|---|---|---|---|---|---|---|
|  |  |  | Other partition walls | Partition walls 2Y$_r$ | Point O$_1$ angle | Point P$_1$ angle |  |
| Example 7 | φ118.4 (Circle) | 400 | 90 | 120 | 35 | 75 | No problem |
| Example 8 | φ118.4 (Circle) | 400 | 90 | 120 | 45 | 70 | No problem |
| Example 9 | φ118.4 (Circle) | 400 | 90 | 120 | 50 | 60 | No problem |
| Example 10 | φ118.4 (Circle) | 400 | 90 | 100 | 50 | 60 | No problem |
| Comparative Example 2 | φ118.4 (Circle) | 400 | 90 | 90 | None | None | Broken |
| Example 11 | φ118.4 (Circle) | 400 | 90 | 110 | 50 | 60 | No problem |
| Comparative Example 3 | φ118.4 (Circle) | 400 | 90 | 90 | None | None | Broken |
| Example 12 | φ143.8 (Circle) | 400 | 90 | 120 | 50 | 60 | No problem |
| Comparative Example 4 | φ143.8 (Circle) | 400 | 90 | 90 | None | None | Broken |
| Example 13 | 125.0 × 80.0 (ellipse) | 400 | 90 | 120 | 35 | 85 | No problem |
| Example 14 | 125.0 × 80.0 (ellipse) | 400 | 90 | 100 | 35 | 85 | No problem |
| Example 15 | 147.0 × 95.0 (ellipse) | 400 | 90 | 100 | 40 | 80 | No problem |
| Example 16 | 147.0 × 95.0 (ellipse) | 400 | 90 | 100 | 50 | 70 | No problem |
| Comparative Example 5 | 147.0 × 95.0 (ellipse) | 400 | 90 | 90 | None | None | Broken |
| Example 17 | 169.7 × 80.8 (ellipse) | 400 | 90 | 100 | 50 | 70 | No problem |
| Example 18 | 169.7 × 80.8 (ellipse) | 400 | 90 | 100 | 60 | 70 | No problem |
| Comparative Example 6 | 169.7 × 80.8 (ellipse) | 400 | 90 | 90 | None | None | Broken |

As seen from Table 2, the honeycomb structures obtained in Comparative Examples 2 to 6 in which all the partition wall thicknesses were equal were broken by the pressure at the time of the canning, but the honeycomb structure including the thickened partition walls whose longitudinal direction in the reinforcing part region was the Y-direction was not broken. As seen from the results of Examples 10, 14, 16 to 18, when the partition wall thickness TX$_r$ was only changed to 100 µm from 90 µm, that is, increased by 11%, a satisfactory effect was obtained. When the partition wall thicknesses TY$_r$ in the reinforcing part region in which the angles of the points O$_1$ and P$_1$ were set to 50 degrees and 60 degrees, respectively, with the section having the circular shape or in the reinforcing part region in which the angles of the points O$_1$ and P$_1$ were set to 60 degrees and 70 degrees, respectively, with the section having the elliptic shape were only increased, the satisfactory effect was obtained.

Industrial Applicability

As described above, for a honeycomb structure of the present invention, since a thickness (TY) of a partition walls whose longitudinal direction is one direction is greater than that (TX) of a partition walls whose longitudinal direction is the other direction, deformation at the time of extrusion is suppressed, and an isostatic strength is enhanced. When TY in a reinforcing part region, that is, TY$_r$ is only increased, a satisfactory canning strength is obtained. The above-described effect is easily achieved by use of an extruding method of the present invention. Therefore, the honeycomb structure of the present invention and a method of manufacturing the structure are useful for a filter, a catalyst carrier, or the like.

The invention claimed is:

1. A honeycomb structure comprising:
a number of cells partitioned by partition walls and extending through an axial direction,
wherein a thickness (TY) of the partition walls whose longitudinal direction is one direction (Y-direction) in a section perpendicular to the axial direction of the honeycomb structure and thickness (TX) of the partition walls whose longitudinal direction is the other direction have a relation of $1.10 \leq TY/TX \leq 1.33$, and TX is 10 µm $\leq$ TX $\leq$ 95 µm;

wherein the honeycomb structure is ceramic and the partition walls whose longitudinal direction is one direction intersect with the partition walls whose longitudinal direction is the other direction.

2. The honeycomb structure according to claim 1, wherein a ratio of an open frontal area of the honeycomb structure is 60% to 95%.

3. The honeycomb structure according to claim 1, wherein a shape of a section of the cell perpendicular to the axial direction is a polygonal shape.

4. The honeycomb structure according to claim 3, wherein the polygonal shape is one or more polygonal shapes selected from a group consisting of a square shape, a rectangular shape, a triangular shape, and a hexagonal shape.

5. The honeycomb structure according to claim 1, wherein the shape of the section perpendicular to the axial direction of the honeycomb structure is an elliptic shape, an oval shape, or an irregular shape, and a short-diameter direction of the section is the Y-direction.

6. The honeycomb structure according to claim 4, wherein the shape of the section perpendicular to the axial direction of the honeycomb structure is an elliptic shape, an oval shape, or an irregular shape, and a short-diameter direction of the section is the Y-direction.

7. The honeycomb structure according to claim 1, wherein the thickness of the partition walls in an outer peripheral portion of the honeycomb structure is greater than that of the partition walls in an inner portion.

8. The honeycomb structure according to claim 4, wherein the thickness of the partition walls in an outer peripheral portion of the honeycomb structure is greater than that of the partition walls in an inner portion.

9. The honeycomb structure according to claim 5, wherein the thickness of the partition walls in an outer peripheral portion of the honeycomb structure is greater than that of the partition walls in an inner portion.

10. The honeycomb structure according to claim 1, wherein the honeycomb structure has a cylindrical outer wall which surrounds the partition walls, and
  in a condition that, in the section perpendicular to the axial direction of the honeycomb structure,
  one intersection of the outer wall and one line extending in a direction of 35 degrees with respect to the Y-direction from a center of the section is a point $O_1$,
  one intersection of the outer wall and one line extending in a direction of 75 degrees with respect to the Y-direction from the center is a point $P_1$,
  one intersection of the outer wall and a line extending in the Y-direction from the point $O_1$ is a point $O_2$, and
  one intersection of the outer wall and a line extending in the Y-direction from the point $P_1$ is a point $P_2$,
  the thickness of at least some of the partition walls whose longitudinal direction is the Y-direction in a region surrounded with lines connecting the point $O_1$ to the point $P_1$ along the outer wall (a circular arc line), the point $P_1$ to the point $P_2$ (a straight line), the point $P_2$ to the point $O_2$ along the outer wall (a circular arc line), and the point $O_2$ to the point $O_1$ (a straight line) is greater than that of other partition walls.

11. The honeycomb structure according to claim 1, wherein the honeycomb structure has an oval cylindrical or an elliptic cylindrical outer wall surrounding the partition walls, and the partition walls whose Y-direction in the section perpendicular to the axial direction of the honeycomb structure is a short-diameter direction of an oval or elliptic sectional shape, and
  in the condition that, in the section, one intersection of the outer wall and one line extending in a direction of 35 degrees with respect to the Y-direction from a center of the section is a point $O_1$,
  one intersection of the outer wall and one line extending in a direction of 85 degrees with respect to the Y-direction from the center is a point $P_1$,
  one intersection of the outer wall and a line extending in the Y-direction from the point $O_1$ is a point $O_2$, and
  one intersection of the outer wall and a line extending in the Y-direction from the point $P_1$ is a point $P_2$,
  the thickness of at least some of the partition walls whose longitudinal direction is the Y-direction in a region surrounded with lines connecting the point $O_1$ to the point $P_1$ along the outer wall (a circular arc line), the point $P_1$ to the point $P_2$ (a straight line), the point $P_2$ to the point $O_2$ along the outer wall (a circular arc line), and the point $O_2$ to the point $O_1$ (a straight line) is greater than that of other partition walls.

12. A honeycomb structure converter comprising;
  a metallic case, and
  a honeycomb structure canned in the metallic case;
  the honeycomb structure having a number of cells partitioned by partition walls and extending through an axial direction,
  wherein a thickness (TY) of the partition walls whose longitudinal direction is one direction (Y-direction) in a section perpendicular to the axial direction of the honeycomb structure and thickness (TX) of the partition walls whose longitudinal direction is the other direction have a relation of $1.10 \leq TY/TX \leq 1.33$, and TX is 10 μm$\leq$TX$\leq$95 μm;

wherein the honeycomb structure is ceramic and the partition walls whose longitudinal direction is one direction intersect with the partition walls whose longitudinal direction is the other direction.

13. The honeycomb structure converter according to claim 12; wherein the honeycomb structure has a cylindrical outer wall which surrounds the partition walls, and
  in a condition that, in the section perpendicular to the axial direction of the honeycomb structure,
  one intersection of the outer wall and one line extending in a direction of 35 degrees with respect to the Y-direction from a center of the section is a point $O_1$,
  one intersection of the outer wall and one line extending in a direction of 75 degrees with respect to the Y-direction from the center is a point $P_1$,
  one intersection of the outer wall and a line extending in the Y-direction from the point $O_1$ is a point $O_2$, and
  one intersection of the outer wall and a line extending in the Y-direction from the point $P_1$ is a point $P_2$,
  the thickness of at least some of the partition walls whose longitudinal direction is the Y-direction in a region surrounded with lines connecting the point $O_1$ to the point $P_1$ along the outer wall (a circular arc line), the point $P_1$ to the point $P_2$ (a straight line), the point $P_2$ to the point $O_2$ along the outer wall (a circular arc line), and the point $O_2$ to the point $O_1$ (a straight line) is greater than that of other partition walls; and
  the honeycomb structure is canned by two divided metallic cases, and integrated.

14. The honeycomb structure converter according to claim 12; wherein the honeycomb structure has an oval cylindrical or an elliptic cylindrical outer wall surrounding the partition walls, and the partition walls whose Y-direction in the section perpendicular to the axial direction of the honeycomb structure is a short-diameter direction of an oval or elliptic sectional shape, and
  in the condition that, in the section, one intersection of the outer wall and one line extending in a direction of 35 degrees with respect to the Y-direction from a center of the section is a point $O_1$,
  one intersection of the outer wall and one line extending in a direction of 85 degrees with respect to the Y-direction from the center is a point $P_1$,
  one intersection of the outer wall and a line extending in the Y-direction from the point $O_1$ is a point $O_2$, and
  one intersection of the outer wall and a line extending in the Y-direction from the point $P_1$ is a point $P_2$, the thickness of at least some of the partition walls whose longitudinal direction is the Y-direction in a region surrounded with lines connecting the point $O_1$ to the point $P_1$ along the outer wall (a circular arc line), the point $P_1$ to the point $P_2$ (a straight line), the point $P_2$ to the point $O_2$ along the outer wall (a circular arc line), and the point $O_2$ to the point $O_1$ (a straight line) is greater than that of other partition walls; and the honeycomb structure is canned by two divided metallic cases, and integrated.

15. A method of molding a honeycomb structure, the honeycomb structure having;

a number of cells partitioned by partition walls and extending through an axial direction, wherein a thickness (TY) of the partition walls whose longitudinal direction is one direction (Y-direction) in a section perpendicular to the axial direction of the honeycomb structure and thickness (TX) of the partition walls whose longitudinal direction is the other direction have a relation of $1.10 TY/TX \leq 1.33$, and TX is $10 \ \mu m \leq TX \leq 95 \ \mu m$;

the method comprising an extrusion molding such that the Y-direction is a direction of gravity; wherein the honeycomb structure is ceramic and the partition walls whose longitudinal direction is one direction intersect with the partition walls whose longitudinal direction is the other direction.

* * * * *